United States Patent
Ohms

Patent Number: 5,421,197
Date of Patent: Jun. 6, 1995

[54] METHOD OF MEASURING IRREGULARITIES OF A PNEUMATIC TIRE

[75] Inventor: Klaus-Peter Ohms, Darmstadt, Germany

[73] Assignee: Hofmann Maschinenbau GmbH, Pfungstadt, Germany

[21] Appl. No.: 151,380

[22] Filed: Nov. 12, 1993

[30] Foreign Application Priority Data

Nov. 12, 1992 [DE] Germany .................. 42 38 118.5

[51] Int. Cl.$^6$ ............................................. G01M 17/02
[52] U.S. Cl. .................................................. 73/146
[58] Field of Search ..................................... 73/146

[56] References Cited

U.S. PATENT DOCUMENTS

| | | | |
|---|---|---|---|
| 4,805,125 | 2/1989 | Beebe | 73/146 |
| 4,955,229 | 9/1990 | Himmler | 73/146 |
| 5,027,649 | 7/1991 | Himmler | 73/146 |
| 5,060,173 | 10/1991 | Tsuji | 73/146 |
| 5,313,827 | 5/1994 | Yovichin | 73/146 |

Primary Examiner—Richard E. Chilcot, Jr.
Assistant Examiner—Jewel V. Artis
Attorney, Agent, or Firm—Cushman Darby & Cushman

[57] ABSTRACT

A method of measuring irregularities of a pneumatic tire comprises carrying out first and second measuring runs, each of which involves rolling the tire in an inflated condition in a rotary mounting means under a given preload against a test surface and measuring the reaction forces which occur in that operation in the form of two force fluctuation diagrams. The tire is turned, for example, through 120° or 180° about the axis of the rotary mounting means between the measuring runs and a correction value is ascertained from the two force fluctuation diagrams to compensate for error values resulting from the rotary mounting means.

8 Claims, 3 Drawing Sheets

METHOD OF MEASURING IRREGULARITIES OF A PNEUMATIC TIRE

BACKGROUND OF THE INVENTION

1. Field of the Invention

The present invention is directed to a method of measuring irregularities in a pneumatic tire.

2. Description of the Related Art

One method of measuring irregularities of a pneumatic tire comprises rolling the tire in an inflated condition in a rotary mounting arrangement and under a predetermined preload against a test surface, and measuring the reaction forces which occur in that operation, in the form of a force fluctuation diagram. Such a method is to be found, for example, in the publication "Werkstatt und Betrieb 103' (1970), pages 183 through 188. More specifically, that method involves investigating the spring behavior or spring characteristics of a tire which rolls under a loading against a test drum, in two mutually perpendicular axes. As an alternative to a test drum, the test surface against which the inflated tire is rolled may be an endless belt which passes around first and second guide or deflection rollers and on which the tire to be tested is supported. The reaction forces which occur during the rolling movement of the tire against the test surfaces are usually detected in the form of tangential, radial and lateral forces. The force fluctuation diagrams which are produced in the measuring procedure by virtue of measurement of the reaction forces occurring provide information about the irregularity of the tire.

The rotary mounting arrangement for supporting the inflated tire in the measuring procedure may be in the form of measuring rim members, between which the pneumatic tire is held in an inflated condition, in the testing machine. It is also possible for the pneumatic tire, when fitted to a disk wheel, to be introduced in an inflated condition into the testing machine. In that case the wheel is mounted in a clamping and centering assembly, rotatably about the axis of rotation thereof.

Radial runout and lateral runout deviations of the measuring rim members of the testing machine, or centering defects in the clamping and centering mounting assembly, give rise to error values which are contained in the resulting force fluctuation diagram with respect to the reaction forces to be measured. The errors falsify the force fluctuation diagram which is intended to provide information about the quality of the pneumatic tire. For example, a radial run-out error in the measuring rim member in the form of a deviation of 0.1 mm, depending on the structure of the respective pneumatic tire to be tested, can give rise to an error, for example, in the radial force of about 10-20N. In addition, when using measuring machines with divided measuring rim members, the rim member halves do not remain properly associated with each other in terms of positioning. Therefore, different radial run-out deviations in the two measuring rim members have different effects on the tire beads and related parts of the tire, depending on the respective position of the two measuring rim members relative to each other.

SUMMARY OF THE INVENTION

An object of the present invention is to provide a method of measuring irregularities of a pneumatic tire, in which measurement value falsification effects caused by the rotary mounting arrangement in the force fluctuation diagram can be at least substantially reduced.

Another object of the present invention is to provide a pneumatic tire irregularity-measuring method which involves a simple operating procedure while nonetheless affording adequate accuracy.

In accordance with the present invention, the foregoing and other objects are achieved by a method of measuring irregularities of a pneumatic tire which in an inflated condition is rolled in a rotary mounting means under a predetermined preload against a test surface. Reaction forces, which occur in that operation, are then measured and recorded in the form of a force fluctuation diagram. The method involves carrying out first and second measuring runs, wherein between the first and second measuring runs the tire is rotated about the axis of rotation of the rotary mounting means. The first and second force fluctuation diagrams, recorded during the measuring runs, are arithmetically or computationally combined together and the first harmonic resulting from geometrical flaws or errors in the rotary mounting means is determined. The first harmonic ascertained in that way is superimposed on one of the first and second force fluctuation diagrams, thereby to eliminate the error component resulting from the geometrical flaws of the rotary mounting means.

In determining the first and second force fluctuation diagrams during the first and second measuring runs, a series of preferably at least ten measurement values and possibly up to around thirty measurement values is evaluated in each run, by an averaging operation. That procedure can minimize the influence of variations in the values, such as, for example, fluctuations in the air pressure in the tire, the influence of the measuring or test surface such as a test drum, and the like, in the force fluctuation diagram which is to be subsequently evaluated.

As indicated, the tire is rotated relative to the rotary mounting means about the axis thereof. If the tire is clamped between two measuring rim members for the measuring procedure, the tire is rotated relative to the axis of the two measuring rim members. If, on the other hand, the entire wheel unit comprised of a disk wheel and a pneumatic tire thereon is tested in a measuring machine, the wheel is rotated relative to the clamping and centering mounting assembly of the measuring machine. The rotary movement is preferably through an angle of at least substantially 120° or at least substantially 180°.

In that situation, geometrical flaws which act as a first harmonic in the radial force fluctuations and the lateral force fluctuations can be compensated for, by means of radial and/or lateral force measurement. It is assumed that when the tire to be tested is mounted in two measuring rim halves, both rim halves are effective in holding the tire, and a measuring system is associated with each of the two rim halves, to ascertain the respective position thereof. Alternatively, the two measuring rim members are always associated with each other in the same manner. When the procedure involves rotating a fully assembled wheel comprised of a disk wheel and a pneumatic tire mounted thereon, the wheel is supported by a suitable play-compensating clamping and centering mounting assembly in a measuring machine.

It may be noted at this point that German patent specification No. 12 78 140 discloses a procedure for unbalance measurement of a rotary member which comprises carrying out two measuring runs, and ascertaining the respective total unbalance measurement values in each of the measuring runs. The rotary member is turned through 180° between the two measuring runs. Formation of half the vectorial sum of the ascertained unbalances provides a storable measurement parameter equivalent for the measurement parameter component which causes problems and which, in subsequent measuring runs, is caused to act on the newly produced measurement values.

In contrast thereto, the method of the present invention involves the elimination of error values which are caused by the measuring machine used and which have an effect on non-vectorial measured reaction forces and, in particular for example, radial force fluctuations.

BRIEF DESCRIPTION OF THE DRAWINGS

Further objects, features and advantages of the present invention will be more clearly apparent from the following description of preferred embodiments thereof.

DESCRIPTION OF THE PREFERRED EMBODIMENTS

Figure 1:
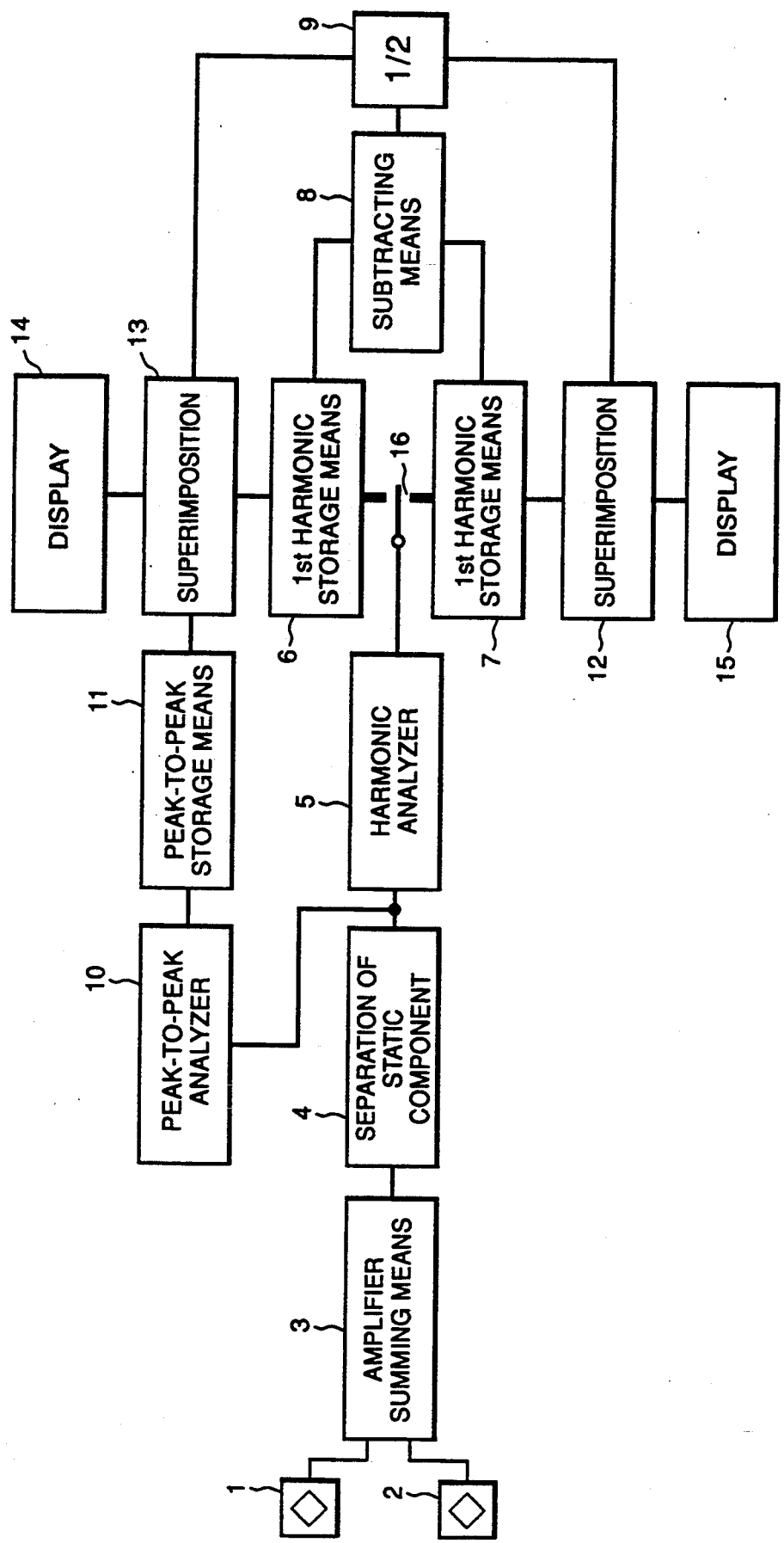
FIG. 1 shows a block circuit diagram of a measurement value evaluation apparatus which can be used for carrying out the method according to the invention.

Referring to the drawings, a pneumatic tire which is to be tested in respect of irregularity thereof is rolled against a test surface (not shown), for example, a test drum, in a conventional fashion (reference may be directed in this respect to the publication "Automobil-Industrie 2/71", pages 85 through 90, which are hereby incorporated by reference). The tire which is tested in an inflated condition may be mounted on a disk wheel, thus forming a wheel unit which will be subjected to the measuring procedure.

Reference numerals 1 and 2 in FIG. 1 identify force-measuring transducers which are operatively associated with the shaft of the test drum against which the inflated pneumatic tire is rolled under a predetermined preload condition. The transducers 1 and 2 are operative to measure the reaction forces which occur at the contact patch where the tire is in contact with the test drum. Transducers 1 and 2 produce measurement signals or measurement values which are passed to a processing stage such as amplifier summing means 3 for processing therein. The processing stage 3 may comprise an amplifier and a summing device. Connected to the output side of the processing stage 3 is a separation stage 4 in which the static component is removed from the curve of forces obtained in relation to time. In order to ascertain a peak-to-peak value, the signal from which the static component has been removed is passed to a peak-to-peak analyzer as indicated at 10. The peak-to-peak value from the analyzer 10 can be stored in a storage device 11 which is connected to the analyzer 10.

The signal which corresponds to the force curve and from which the static component has been removed in the separating stage 4 is also passed to a harmonic analyzer 5 which, for a respective revolution of the tire during a measuring run, forms the first harmonic from that signal. In this operating procedure, the measuring values for at least ten revolutions and up to thirty revolutions can be evaluated by subsequent averaging. That produces a first harmonic in which fluctuations in the air pressure of the inflated tire and the influences of the measuring or test drum and other deviational value influences are minimized or even eliminated. The first harmonic with respect to the force-time diagram, which is obtained in the manner described in the two immediately preceding sentences in a first measuring run, is passed by way of a switch 16, when in a first switching position, to a first storage means 6 for the first harmonic.

After the first measuring run has been concluded, the tire, or the wheel unit comprising a disk wheel and the tire mounted thereon, is rotated on its rotary mounting means through a given angle, for example, 120° or 180° about the axis of rotation of the rotary mounting means. A second measuring run is then performed and the first harmonic is ascertained for that second measuring run in the same manner as in the first measuring run. In the second measuring run, the switch 16 is then moved into its other or second switching position so that the first harmonic for the second measuring run is passed to the second storage means 7 for that harmonic.

Figure 2A:
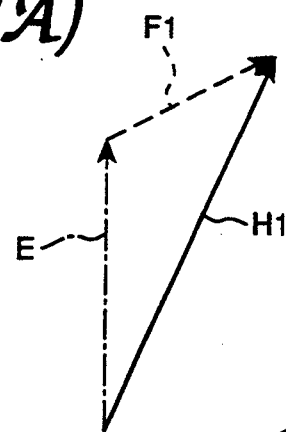
FIG. 2 shows vector diagrams for an angle of rotation of 180°.
Figure 2B:
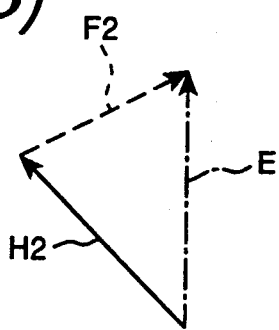
Figure 2C:
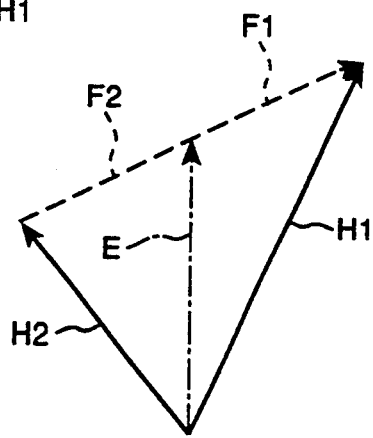

The first harmonics obtained in the first and second measuring runs are composed of the true harmonic corresponding to the properties or irregularities of the tire being tested, and the harmonic resulting from any geometrical flaws or errors of the rotary mounting means. In other words, the first harmonics contained in the first and second storage means 6 and 7 are falsified by the geometrical flaws of the rotary mounting means. In order to ascertain the falsifying first harmonic which is caused by the geometrical flaws of the rotary mounting means, the two first harmonics which were ascertained in the first and second measuring runs are subtracted in a vector subtracting means as diagrammatically indicated at 8 in FIG. 1. In FIGS. 2(A) and (B), the two first harmonics H1 and H2 for the first and second measuring runs are illustrated as vectors, the tire or the wheel unit having been turned through 180° between the first and second measuring runs. The harmonics H1 and H2 thus contain the true first harmonic which is illustrated as vector E, and the first harmonic which results from the geometrical flaws of the rotary mounting means and which is illustrated as vector F1 in FIG. 2(A) and vector F2 in FIG. 2(B). The vector subtraction operation which is carried out in the subtracting means 8 is shown in FIG. 2(C). That subtraction operation produces a vector which is composed of the two vectors F1 and F2 which are equal in magnitude. The magnitudes of the vectors F1 and F2 can be ascertained by the dividing means indicated at 9 in FIG. 1, which halves the vector difference.

In the illustrated embodiment, half the vector difference is combined with the harmonic contained in the second storage means 7, in a vector superimposition means 12. When considering the diagram shown in FIG. 2, the vectors H2 and F2 are superimposed here, by those two vectors being subtracted. That vector subtraction operation then gives the vector E which represents the true first harmonic which reproduces the quality or the irregularity of the tire being tested.

It is, however, also possible for the half vector difference which is formed in the dividing means 9 and which corresponds to the vector F1 to be combined with the vector H1 which corresponds to the harmonic stored in the first storage means 6, by vector subtraction. That procedure then also gives the vector E which represents the true first harmonic, as can be seen from the diagram in FIG. 2(C).

FIG. 2 shows the vector diagrams in the situation where the tire or the wheel unit has been turned through 180° relative to the rotary mounting means, between the first and second measuring runs.

Reference will now be made to FIG. 3 showing the vector diagrams which are produced when the wheel or tire is turned through 120°.

Figure 3A:
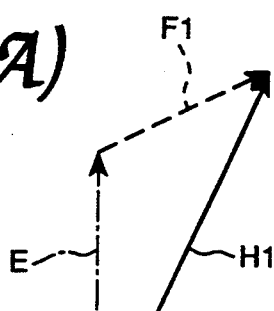
FIG. 3 shows vector diagrams for an angle of rotation of 120°.
Figure 3B:
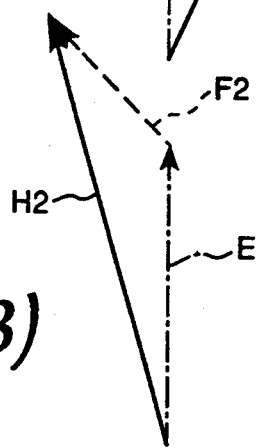
Figure 3C:
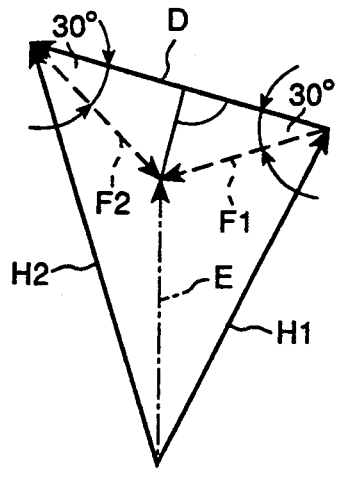

Whereas the phase difference between F1 and F2 in FIG. 2 is 180° in the situation shown in FIG. 3 the phase difference between F1 and F2 is 120°. In the operation of superimposing the vectors in the vector superimposition means 12, account is taken of that different angle by virtue of the fact that two congruent right-angled triangles can be formed from half the vector difference D which is formed in the vector subtracting means 8 and in the dividing means 9; the base sides of the two triangles correspond to the amounts of the vectors F1 and F2. That can be seen from FIG. 3(C) which illustrates a combination of the vector diagrams of FIGS. 3(A) and 3(B). The superimposition means 12 effects the vector superimposition operation illustrated in FIG. 3(C), involving the first harmonic H2 stored in the second storage means 7, with the first harmonic F2 which arises from half the vector difference D/2 and the angles, which are predetermined by the rotary movement of the wheel unit or tire through 120°, in two congruent triangles. In the same manner, the first harmonic represented by the vector F1 can also be superimposed with the harmonic Hi stored in the first storage means 6. The true harmonics which are obtained in that situation and which are represented by the vector E can then be displayed in a display means 15.

Figure 4:
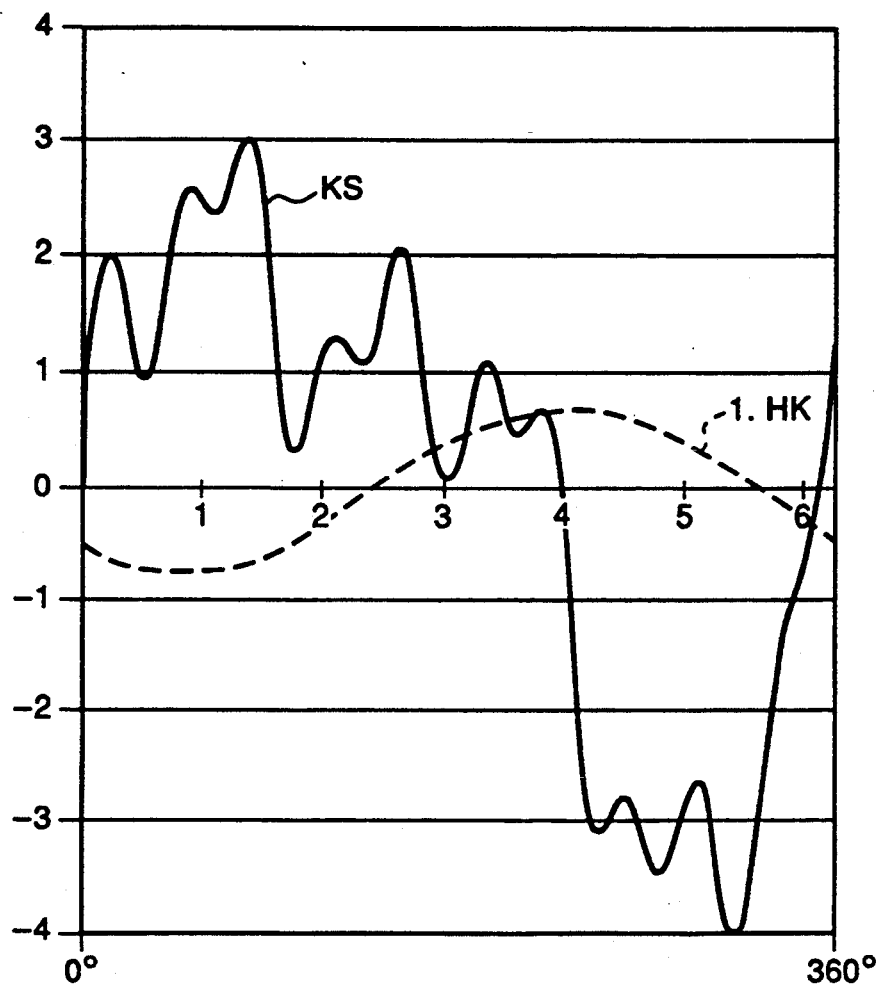
FIG. 4 shows a diagram illustrating correction of the peak-to-peak value.

The procedure may also involve correcting the peak-to-peak value. For that purpose, a force fluctuation pattern which has been ascertained from a plurality of revolutions (for example, 10–30), in respect of a tire revolution (0° through 360°) can be stored in angular relationship, in the storage means 11. FIG. 4 illustrates an example of such a force fluctuation which is identified by KS in FIG. 4. The illustrated force fluctuation pattern which for example represents the radial force fluctuation has a peak-to-peak value of about 7 kp (corresponding to 70N). That variation with respect to time, or variation in dependence on angle of rotation, in the respective instantaneous values of the force fluctuation, is superimposed in a superimposition means 13 on the variation with respect to time, or the variation in dependence on angle, of the first harmonic which is supplied by the dividing means 9 and which corresponds to a correction vector, as indicated in FIG. 4 by 1.HK. That superimposition is diagrammatically illustrated in FIG. 4. That superimposition of the two variations in respect of time in the force fluctuation KS and the first harmonic HK gives the corrected peak-to-peak value which is displayed in a display means 14 connected to the output of the means 13.

It will be appreciated that the above-described methods of measuring irregularity of a pneumatic tire have been set forth solely by way of example and illustration of the principles of the present invention and that various modifications and alterations may be made therein without thereby departing from the spirit and scope of the present invention.

What is claimed is:

1. A method of measuring irregularities of a pneumatic tire comprising the steps of: carrying out first and second measuring runs which include rolling an inflated tire in a rotary mounting device under a predetermined preload against a test surface, measuring reaction forces which occur in each measuring run and forming a force fluctuation diagram from the measured forces and storing such data; rotating the tire through a given angle between the first and second measuring runs; computationally combining together the first and second force fluctuation diagrams resulting from the measuring runs; determining a first harmonic resulting from geometrical flaws in the rotary mounting device; and superimposing the first harmonic on one of the force fluctuation diagrams to thereby eliminate an error component resulting from geometrical flaws of the rotary mounting device.

2. A method as set forth in claim 1 wherein the first harmonic is formed with respect to the magnitude and phase position from the first harmonics of the first and second force fluctuation diagrams.

3. A method as set forth in claim 1 wherein the tire is rotated through a given angle of about 120°.

4. A method as set forth in claim 1 wherein the tire is rotated through a given angle of about 180°.

5. A method as set forth in claim 1 wherein to determine the first harmonic resulting from geometrical flaws of the rotary mounting device, the first harmonics of the first and second force fluctuation diagrams are subtracted from each other, in consideration of the phase involved.

6. A method as set forth in claim 5 wherein as a correction value half the difference of the first harmonics of the force fluctuation diagrams is superimposed on one of the force fluctuation diagrams.

7. A method as set forth in claim 1 comprising superimposing the correction value for correction of the peak-to-peak values.

8. A method as set forth in claim 1 comprising superimposing the correction value for correction of the first harmonics of the force fluctuation diagrams.

* * * * *